United States Patent [19]

Kawert

[11] Patent Number: 4,468,326

[45] Date of Patent: Aug. 28, 1984

[54] PROCESS IN MICROBIOLOGICAL PURIFICATION AND A DEVICE AND MATERIALS THEREFOR

[75] Inventor: Kawe Kawert, Poppelvägen, Sweden

[73] Assignee: Jorgen Jolner, Sweden

[21] Appl. No.: 393,430

[22] Filed: Jun. 29, 1982

[51] Int. Cl.³ .............................................. C02F 3/08
[52] U.S. Cl. .................................. 210/619; 210/150; 261/92
[58] Field of Search .............. 210/619, 150, 151, 903; 261/92

[56] References Cited

U.S. PATENT DOCUMENTS

| 3,466,241 | 9/1969 | Simpson | 210/619 |
| 3,575,849 | 4/1971 | Torpey | 210/151 |
| 3,704,783 | 12/1972 | Antonie | 210/151 |
| 3,886,074 | 5/1975 | Prosser | 210/150 |
| 3,904,525 | 9/1975 | Rosenberg | 210/150 |
| 4,115,268 | 9/1978 | Thissen | 210/150 |
| 4,211,647 | 7/1980 | Friedman et al. | 210/603 |
| 4,345,997 | 8/1982 | McConnell et al. | 261/92 |

FOREIGN PATENT DOCUMENTS

| 2914689 | 10/1980 | Fed. Rep. of Germany | 210/619 |
| WO81/03325 | 11/1981 | Sweden | 210/619 |

OTHER PUBLICATIONS

Lue-Hing et al., "Biological Nitrification of Sludge Supernatent by Rotating Disks," WPCFJ, Jan. 1976, pp. 25-46.

Marsh et al., "Coupled Trickling Filter Rotating Biological Contactor Nitrification Process," WPCFJ, Oct. 1981, pp. 1469-1480.

Primary Examiner—Peter A. Hruskoci
Attorney, Agent, or Firm—Burns, Doane, Swecker & Mathis

[57] ABSTRACT

Process for bio-processing of waste water with bio-rotors submerged in the water, with the substrate growth surface constituting the rotor. The rotor is dimensioned relative to the water volume so that the amount of water is 1 to 10 liter of water per m² substrate surface, preferably 2 to 8 liters per m² substrate surface. The material of the rotor has a specific surface of 150-400 m² per m³ material outer volume (preferably 200-350 m² per m³). When this latter ratio results in water volumes in excess of the submerged rotor volume, the volume of the basin is increased but with one or more shields being arranged in the basin to prevent the water from bypassing the rotor.

15 Claims, 7 Drawing Figures

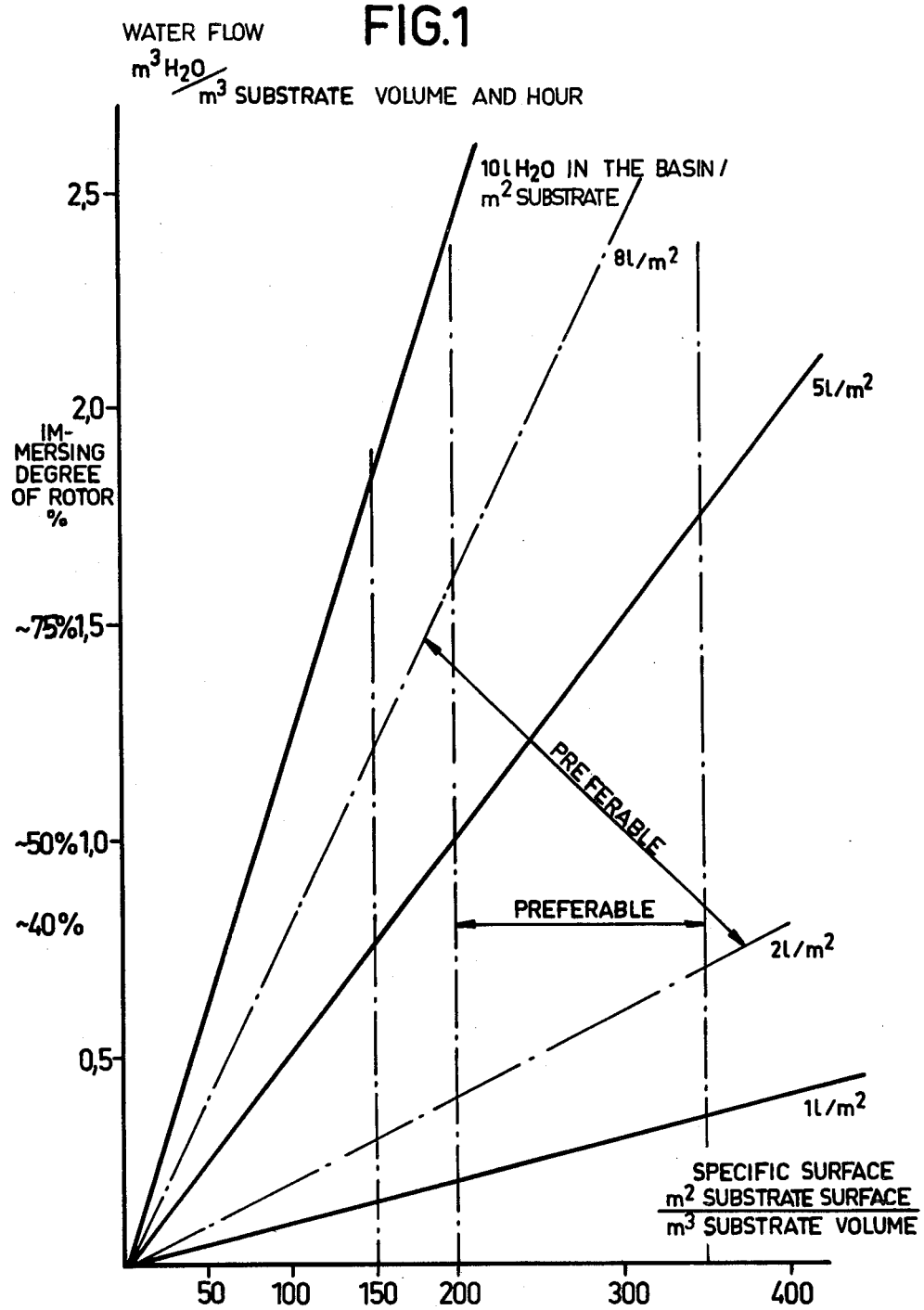

PROCESS IN MICROBIOLOGICAL PURIFICATION AND A DEVICE AND MATERIALS THEREFOR

BACKGROUND AND SUMMARY OF THE PRESENT INVENTION

The present invention relates to biological purification of waste water. Biological purification of waste water has of course always existed in the nature and with the increased demands on purification of waste water attempts have been made also to utilize these effects economically. Purification was first carried out in such a way that the waste water was kept in big basins having a large surface through which bubbles of oxygen or air were optionally passed to get a bacterial degradation of the organic substances in the water. In order to achieve a more economical biological purification of the waste water more complicated devices have also been constructed to reduce the size of these basins. One example thereof is the rotating biological contactor(RBC) which means in principle that the bacterial growth or the biological degradation in the water is made to take place on the surface of contactor materials. The contactor materials are more or less submerged in a basin and are rotated to bring the microorganism into contact with the air as well as the water and the organic material therein to be degraded. However, so far no real optimization of the constructions and the function of these RBCs has been made. One reason has been that these RBCs have been found to be so substantially much more economical than has been the case before that no further possible development has been considered. The optimization attempts that of course have been made for economical reasons have been relatively hazardous and unsystematical, and therefore no unitary rules and optimization conditions of RBCs are present so far. It is therefore the object of the invention to define a process in microbiological purification making possible an optimization of the operating conditions and consequently a minimizing of the required costs. The present invention also relates to a device based on these principles to indicate the purely practical application of the principles.

In accordance with the invention two parameters are important when dimensioning RBC plants apart from the downright dimensioning of capacity. The first parameter is that the amount of water per $m^2$ of substrate surface should lie between 1 and 10 l water/$m^2$, preferably between 2 and 8 l/$m^2$ of material. The second important parameter is that the specific substrate surface per rotor volume of material according to the invention should be between 150 and 400 $m^2/m^3$ and preferably between 200 and 350 $m^2/m^3$. This range has also been illustrated in the appended diagram.

BRIEF DESCRIPTION OF THE DRAWINGS

The invention will be described in greater detail with reference to the accompanying drawings where FIG. 1 is a graph of the dimensioning parameters;

DETAILED DESCRIPTION OF THE PREFERRED EMBODIMENTS

Figure 1A:
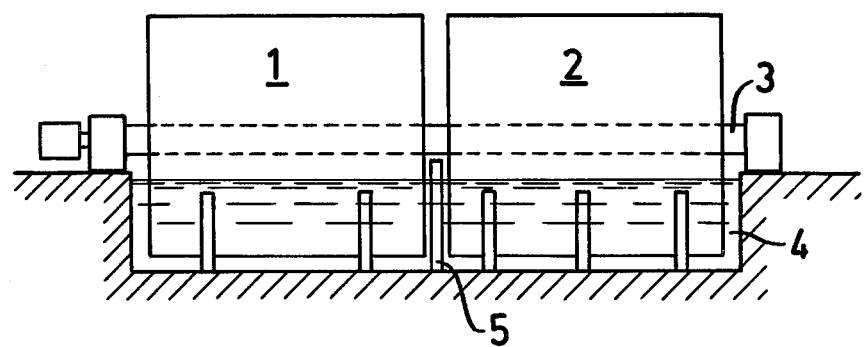
FIGS. 1a and 1b are schematic views of an illustrative example exemplifying how a device may look which has been dimensioned in accordance with the principles of the invention. Moreover.
Figure 1B:
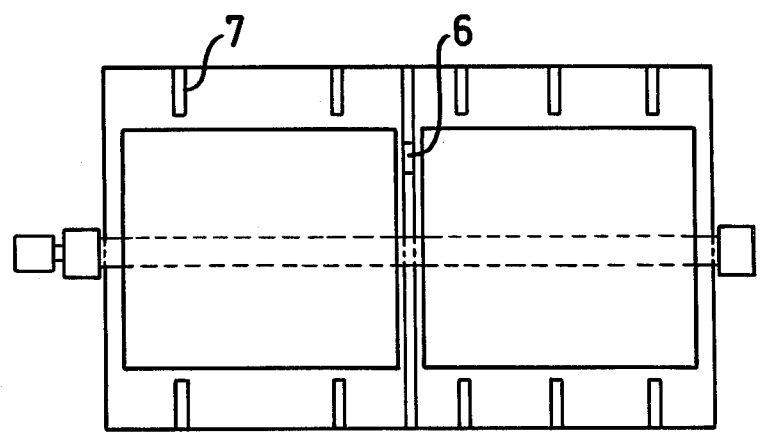

The RBC device shown in FIG. 1a comprises two contactor stages 1 and 2 mounted on a common shaft 3 and immersed in a basin 4. This basin is divided into two chambers, one for each of the rotors 1 or 2, by a partition 5 extending up to the shaft 3. In this partition 5 there is arranged a passage or a hole 6. In this way the water is first made to pass one RBC and then the other RBC for purification. By utilizing the dimensioning concepts in accordance with the invention it has, as is evident, been possible to make the RBCs with a smaller diameter than otherwise possible which has been compensated with an increased water volume. However, in order that no water might be shunted past the rotors baffles 7 arranged at the RBC periphery are arranged in the basins and the rotation of the RBCs provide the pumping of the water which is necessary.

If it is further imagined that the water first passes the RBC 1, the water in this RBC and the basin half will of course contain a larger amount of biologically degradable material, which results in a greater load of sludge, and therefore it is possible to let this RBC have a somewhat less dense material, i.e. with better passageways and a somewhat smaller surface per $m^3$ of material body. With interconnected separation of coarse sludge, the following RBC may have a larger specific surface per $m^3$ contactor. It is also possible to have an anaerobic degradation over certain length sections of the RBCs. It is possible to have a nitrification in other sections. The increased RBC diameter and specific surface increase retention time to obtain as complete purification as possible in as small plant as possible. As the diameter of the RBCs can be reduced in the way described above the driving forces of these as well as stresses on shafts, motors and gears are also reduced, which is a relatively great cost in today's purification plants. These stresses are especially high during the very great torques when a RBC is started after being compelled to be out of operation for some time for one reason or other, which in its turn has led to increased growth on water parts of the rotor.

Figure 2A:
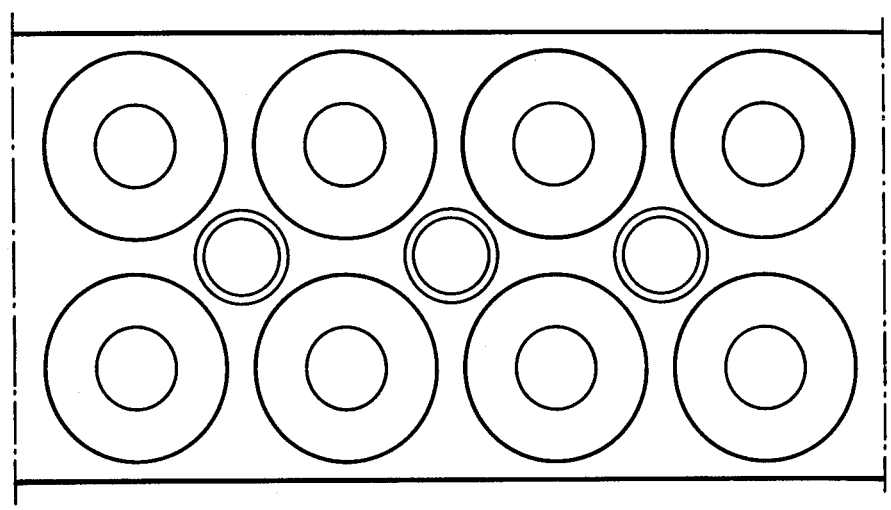
FIGS. 2a, 2b and 2c are cross section of a material suitable for the RBCs according to the invention
Figure 2B:
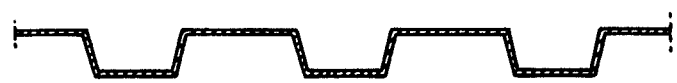
Figure 2C:
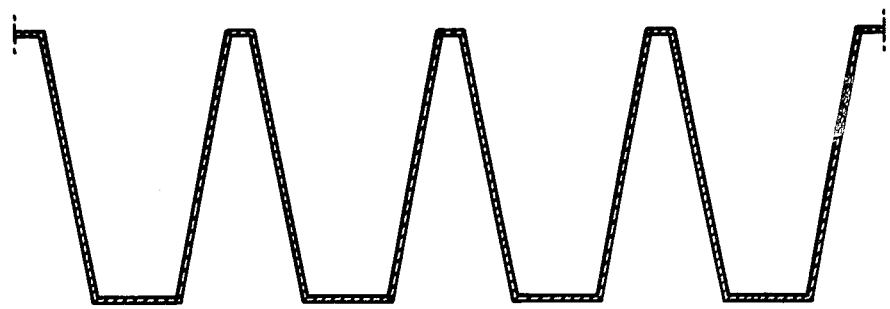

In order to be able to realize by a simple arrangement the relatively high specific surfaces per material volume required according to the invention the material shown in FIGS. 2a, 2b and 2c can preferably be utilized. As is evident, this material consists of conical, regularly arranged embossings in a plastic material. This material is then used in several layers to build up a RBC or a stationary biobed plant. In order to facilitate the build-up of the RBCs it is suggested in accordance with the invention that minor embossings are arranged between the embossings serving as spacing means between the various plastic sheets or layers. The embossings are intended to coact with the tops of adjacent sheets. These minor embossings as well as the tops of the bigger ones are made so that a snap lock is obtained. In this way the need of adhesive or expensive spot welding of the material is eliminated. Glueing as well as welding of these materials may mean a weakening of the material immediately at the places of glueing or welding. This weakening might require that material which are glued or welded must be dimensioned so that they are a little coarser than what is otherwise the case. The embossings are preferably circular, but other forms are of course possible including snaps.

Figure 3:
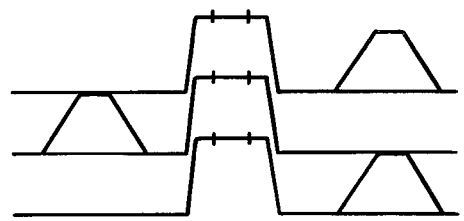
FIG. 3 is a view of another embodiment of the material.

The material sheets composed of a plastic segment type RBC can be given a final fixation by drawing two or more pull rods of a non-corroding material through holes prepared in advance right through the sheets which are forced together and fixed and a more stable and more handy segment will be achieved. In FIG. 3 further embodiment of material shape is shown.

In accordance with a further development of the invention it is further suggested that the RBC material can be provided with a rough surface. In this way the shearing-off of microorganisms from the rotor surface will not result in the material grown microbiologically coming loose totally at the plastic surface. Instead, the strength of the very sludge will at last be so bad that this is broken loose. Therefore the material surface will never be quite clean which results in its turn in the continued growth on the same surface taking place much more rapidly than what is otherwise the case, and the efficiency of plants made in this way is therefore increased substantially.

The principles, preferred embodiments and mode of operation of the present invention have been described in the foregoing specification. However, the invention which is intended to be protected is not to be construed as limited to the particular embodiments disclosed. The embodiments are to be regarded as illustrative rather than restrictive. Variations and changes may be made by others without departing from the spirit of the present invention. Accordingly, it is expressly intended that all such variations and changes which fall within the spirit and scope of the present invention as defined in the claims be embraced thereby.

What is claimed is:

1. A process of microbiological degradation of organic matter in waste water, comprising rotating at least one biological contactor arranged in a basin containing a volume of said waste water to pump said waste water through said basin, the contactor being submerged in the water with a shaft of the contactor above the water surface to provide a substrate growth surface for microorganisms to bring said microorganisms into contact with air to degrade said organic material, said biological contactor being dimensioned relative to the water volume so that the amount of water is 1–10 liters of water per $m^2$ of substrate surface, utilizing a material for the contactor having a substrate growth surface of 150–400 $m^2$ per $m^3$ of contactor material volume, and preventing said waste water being pumped through said basin from bypassing said contactor by providing at least one baffle on each side of said basin extending transverse to the shaft of the contactor.

2. The process of claim 1, wherein a plurality of rotating biological contactors having different diameters and purification process steps are utilized, one of said contactors being employed at each successive purification process step, and a longer retention time being utilized in, at least the largest diameter contactor to attain nitrification of said wate water.

3. The process of any one of claims 1 or 2, wherein the rate of rotation of the biological contactor is greater than 1–2 rpm.

4. The process of claim 1, wherein the amount of water is 2–8 liters per $m^2$ of substrate surface and the substrate growth surface of the material is 200–350 $m^2$ per $m^3$ of contactor material volume.

5. A device for microbiological degradation of organic matter in waste water, comprising a rotating biological contactor arranged in a basin containing a volume of said waste water to pump said waste water through said basin, the contactor being submerged in the basin with a shaft of the contactor being above the water surface to provide a substrate growth surface for microorganisms to bring said microorganisms into contact with air to degrade said organic material, said biological contactor being dimensioned relative to the volume of waste water in the basin such that the amount of water is 1–10 liters of water per $m^2$ of substrate surface, and the substrate material of the contactor having a substrate growth surface of 150–400 $m^2$ per $m^3$ of contactor material volume, and at least one baffle on each side of said basin extending transverse to the shaft of the contactor to prevent said waste water being pumped through said basin from bypassing said contactor.

6. The device of claim 5, comprising means for supplying additional oxygen to the waste water in addition to the oxygen supplied by the motion of the contactor.

7. The device of claim 5, further comprising means for retaining air in the biological contactor material such that the rotating contactor has a lifting force to reduce the load on the shaft of the contactor.

8. The device of claim 5, wherein segments of the contactor comprise a plurality of sheets, the substrate material of the sheets being formed with embossed bodies in the bottoms of which smaller cups are formed and adapted to fit into intermediate longitudinal grooves in an adjacent sheet, said cups being secured in the grooves.

9. The device according to claim 8, wherein the substrate material further comprises clasping means for the connection of the material sheets arranged in the different sheets of material, the clasping means being arranged in the embossed bodies or between the bodies.

10. The device as claimed in claim 8, wherein the substrate material has a surface which is rough.

11. The device according to claim 8, wherein the edges of the substrate material are turned up.

12. The device according to claim 5, wherein segments of the contactor comprise a plurality of sheets, the sheets being secured against each other by pull rods passing through holes in the sheets.

13. The device of claim 5, wherein the amount of water is 2–8 liters per $m^2$ of substrate surface and the substrate growth surface of the material is 200–350 $m^2$ per $m^3$ of contactor material volume.

14. The device of claim 5, wherein segments of the contactor comprise a plurality of sheets, the substrate material of the sheets being formed with embossed bodies, intermediate circular shallow cups being arranged between the embossed bodies and being adapted to fit into intermediate longitudinal grooves in an adjacent sheets.

15. The device of claim 5, further comprising a plurality of rotating biological contactors and purification process steps, one of said contactors being employed at each successive process step, a partition being provided between adjacent process steps, and said partition being provided with at least one opening for the passage of water.

* * * * *